United States Patent [19]
Ludwig

[11] Patent Number: 5,780,549
[45] Date of Patent: Jul. 14, 1998

[54] POLYBUTENE POLYMERS AS MODIFIERS FOR PVC

[75] Inventor: Paul Anthony Ludwig, Parkersburg, W. Va.

[73] Assignee: General Electric Company, Pittsfield, Mass.

[21] Appl. No.: 681,752

[22] Filed: Jul. 29, 1996

[51] Int. Cl.⁶ .......................... C08L 27/06; C08L 51/04; C08L 55/02

[52] U.S. Cl. .................. 525/84; 525/71; 525/80; 525/85; 525/86; 525/239

[58] Field of Search ................ 525/239, 71, 80, 525/84, 85, 86

[56] References Cited

U.S. PATENT DOCUMENTS

| | | | |
|---|---|---|---|
| 3,629,222 | 12/1971 | Coover, Jr. et al. | 526/140 |
| 4,027,087 | 5/1977 | Satoh et al. | 526/114 |
| 4,061,780 | 12/1977 | Yoshida et al. | 424/358 |
| 4,078,020 | 3/1978 | Rose et al. | 525/240 |
| 4,103,078 | 7/1978 | Sato et al. | 526/115 |
| 4,119,267 | 10/1978 | Kydonieus | 229/53 |
| 4,127,618 | 11/1978 | Sutherland et al. | 525/84 |
| 4,230,827 | 10/1980 | Myers | 525/121 |
| 4,311,807 | 1/1982 | McCullough, Jr. et al. | 525/197 |
| 4,923,961 | 5/1990 | Vitands et al. | 528/482 |
| 5,012,030 | 4/1991 | Lane et al. | 585/527 |
| 5,041,491 | 8/1991 | Turke et al. | 524/425 |
| 5,177,277 | 1/1993 | Eryman et al. | 585/255 |
| 5,225,486 | 7/1993 | Money et al. | 525/113 |
| 5,441,816 | 8/1995 | Grohman | 428/520 |

OTHER PUBLICATIONS

Plastics World Article Nov. 1995 pp. 58–59.
Amoco® Polybutene Bulletin 12–23 b.
Amoco June 1995 Bulletin GTSR-120, pp. 1–28.
Amoco Bulletin 12–N, pp. 1–36.

*Primary Examiner*—Mark L. Warzel
*Attorney, Agent, or Firm*—John B. Yates

[57] ABSTRACT

The impact resistance of PVC compounds has been shown to be improved by blending with a polybutene polymer. Enhanced thermal stability was also unexpectedly improved with the addition of the polybutene polymer.

17 Claims, No Drawings

5,780,549

1

POLYBUTENE POLYMERS AS MODIFIERS FOR PVC

BACKGROUND OF THE INVENTION

1. Field of the Invention

This invention relates to modification, specifically thermal and impact modification of poly(vinyl chloride) (hereinafter PVC) with the addition of a polybutene polymer.

2. Description of the Prior Art

Although the PVC impact modifier and thermal stability art is a crowded one, there continues to exist a commercial need for enhanced impact modification and improved thermal stability of PVC. Prior to the present invention, it has never been suggested that polybutene polymers would function as to improve the impact and thermal properties of PVC.

Polybutene has been reported by Amoco Chemical Company to improve the impact strength of various ABS resins as noted on page 58 of Plastics World November 1995. Polybutene has also been reported to improve the impact strength of polypropylene as described in U.S. Pat. No. 5,041,491. However, none of these publications disclose or suggest a composition comprising impact modified PVC containing a polybutene resin. Additionally, none of these publications disclose or suggest that the impact strength or thermal stability of impact modified PVC could enhanced with the addition of a polybutene resin.

SUMMARY OF THE INVENTION

It was quite surprising to discover that addition of polybutene polymer increases the impact strength of PVC compositions. The enhanced ductility allows for lower levels of impact modifier to be utilized to achieve the same ductility level as current commercial products allowing for significant cost savings in the PVC formulation. An additional, and quite unexpected, advantage of such polybutene polymers is that they also dramatically improve the thermal stability of PVC without any decrease in heat distortion temperature of the PVC.

DETAILED DESCRIPTION OF THE INVENTION

The polybutene polymers contemplated as impact modifiers for PVC in this invention are $C_4$ olefin polymers. The polybutene polymers are prepared by polymerizing a mixture of $C_4$ olefins by methods that are well known in the art to obtain a $C_4$ olefin polymer with a number average molecular weight range of from about 100 to about 5,000 g/mol as determined by gel permeation chromatography. Generally speaking, the polymerization reaction is a Friedel-Crafts reaction using a catalyst such as aluminum chloride or boron trifluoride and is disclosed extensively in the patent and technical literature. The hydrocarbon feedstock may be a refinery fraction, a pure monoolefin, or a mixture of monoolefins. Monoolefin feedstock where the olefin contains 3 to 16 carbon atoms is preferred. If a pure olefin is used which is gaseous under ambient conditions it is necessary either to control the reaction pressure or to dissolve the olefin in a solvent medium, inert under the reaction conditions, in order to maintain the olefin in the liquid phase. In the case of isobutylene, which is typical of monoolefins, the feedstock used in the polymerization process may be pure isobutylene or a mixed $C_4$ hydrocarbon feedstock such as that resulting from the thermal or catalytic cracking operation. This is a liquid when under pressure and hence no diluent is needed.

2

The feedstock used may contain between about 5% and about 100% by weight of isobutylene. It is preferred to use a feedstock containing at least about 10% by weight of isobutylene. The hydrocarbon feedstock used may contain, in addition to isobutylene, butanes, butenes, and minor amounts of polymerization byproducts without adverse effect on the polybutene product.

The polymerization temperature is selected based on the molecular weight desired in the product. As is well known, lower temperatures are used for higher molecular weights while higher temperatures are used to obtain lighter products. The polymerization can be carried out in the full range of temperatures generally associated with conventional polybutene polymerization, i.e., about −100° C. to about 50° C.

The resulting $C_4$ polymer typically includes various forms of butene, for example isobutene, 1-butene, trans-2-butene, cis-2-butene, and can contain a small amount of propene and minor amounts of polymerization byproducts. For simplicity, the typical polymer is referred to herein as polybutene polymer. Typically, isobutene constitutes from about 80% to about 95% of the total polybutene polymer. The polybutene polymer has at least one double bond per molecule. However, hydrogenated polybutene polymers, such as those described in U.S. Pat. No. 5,177,277 are also useful in the present invention.

Polybutene polymers are commercially available in a variety of grades from Amoco Chemical Company. Included within the present invention are polybutene polymers which are homopolymer, copolymer, unsaturated, and hydrogenated polymers.

Any PVC is suitable in the invention, since the polybutene polymer is thought to modify all PVC. Of course, any of the usual PVC fillers, stabilizers, modifiers, colorants, lubricants, and other additives can also be used.

In a preferred embodiment of the present invention, the PVC contains an impact modifier to improve the ductility of the PVC. Although any impact modifier contemplated for modifying PVC is included in the present invention, especially preferred impact modifiers include graft copolymer resins comprising a rubbery polymeric substrate and a rigid polymeric superstrate. In a preferred embodiment, the graft copolymer comprises more than 30% by weight rubbery polymeric substrate to rigid polymeric superstrate. More than one graft copolymer resin may used, including more than one type of graft copolymer resin. The graft copolymer resin may also be used in combination with various block copolymer resins, such as, for example, polystyrene-polybutadiene diblock and triblock copolymer resins, polystyrene-poly(ethylene-butylene) diblock and triblock copolymer resins, and polystyrene-poly(ethylene-propylene) diblock and triblock copolymer resins, as well as mixtures of block copolymer resins.

The rubbery polymeric substrate generally comprises repeating units derived from one or more ethylenically unsaturated monomers selected from conjugated diene monomers, non-conjugated diene monomers, $(C_2-C_8)$olefin monomers, $(C_1-C_{12})$alkyl acrylate monomers, ethylenically unsaturated nitrile monomers, and vinyl aromatic monomers. Useful ratios of the aforementioned monomers as well as other useful monomers and rubbery polymeric substrates will be apparent to those skilled in the art.

Suitable conjugated diene monomers include, for example, 1,3-butadiene, isoprene, 1,3-heptadiene, methyl-1, 3-pentadiene, 2,3-dimethylbutadiene, 2-ethyl-1,3-pentadiene, 1,3-hexadiene, 2,4-hexadiene, dichlorobutadiene, bromobutadiene, and dibromobutadiene as well as mixtures of diene monomers. In preferred embodiments, the conjugated diene monomer is 1,3-butadiene or mixtures of 1,3-butadiene with styrene monomer. Suitable non-conjugated diene monomers include, for example, ethylidene norbornene, dicyclopentadiene, hexadiene, and phenyl norbornene. Those skilled in the art can readily select other useful conjugated and non-conjugated diene monomers.

Useful $C_2$–$C_8$ olefin monomers include compounds having from 2 to about 8 carbon atoms per molecule and having a single site of ethylenic unsaturation per molecule. Suitable ($C_2$–$C_8$)olefin monomers include, for example, ethylene, propene, 1-butene, 1-pentene, heptene. Useful ($C_1$–$C_{12}$) alkyl acrylate monomers include acrylates having straight or branched alkyl substituent groups. The alkyl substituent groups generally have from 1 to about 12 carbon atoms per alkyl group and include, for example, methyl, ethyl, n-butyl, sec-butyl, t-butyl, n-propyl, iso-propyl, pentyl, hexyl, heptyl, octyl, nonyl, decyl, undecyl, and dodecyl. Illustrative examples of suitable ($C_1$–$C_{12}$)alkyl acrylates include butyl acrylate, iso-pentyl acrylate, n-hexyl acrylate, and 2-ethyl hexyl acrylate as well as mixtures of any of the foregoing and mixtures of any of the foregoing with other acrylates such as, for example, ethyl acrylate and methyl acrylate. The ethylenically unsaturated nitrile monomer includes acyclic compounds having a single nitrile group and a single site of ethylenic unsaturation per molecule and includes, for example, acrylonitrile and methacrylonitrile. Those skilled in the art can readily select other suitable ($C_2$–$C_8$)olefin, ($C_1$–$C_{12}$)alkyl acrylate, and ethylenically unsaturated nitrile monomers, as well as useful ratios of monomers.

Suitable vinyl aromatic monomers include, for example, styrene and substituted styrenes having one or more alkyl, alkoxyl, hydroxyl, or halo substituent groups attached to the aromatic ring, including, for example, α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene, and vinyl-substituted condensed aromatic ring structures, such as, for example, vinyl napthalene, vinyl anthracene; as well as mixtures of vinyl aromatic monomers. In a preferred embodiment, the vinyl aromatic monomer, when one is used, is styrene, α-methyl styrene, or mixtures of styrene and α-methyl styrene.

The rubbery polymeric substrate may, optionally, include a minor amount, for example, up to 5% by weight based on the weight of the monomers used for the rubbery substrate, of repeating units derived from a polyethylenically unsaturated crosslinking monomer, for example, butylene diacrylate, divinyl benzene, butene diol dimethacrylate, trimethylolpropane tri(meth)acrylate, allyl methacrylate, diallyl maleate, and triallyl cyanurate. Those skilled in the art will be able to select an appropriate polyethylenically unsaturated crosslinking monomer, when one is desired, as well as an appropriate amount of the monomer without undue experimentation.

In a first preferred embodiment, the substrate comprises repeating units derived from one or more conjugated diene monomers, such as, for example, a substantially homopolymeric polybutadiene rubber. In a second preferred embodiment, the substrate comprises repeating units derived from one or more conjugated diene monomers and one or more copolymerizable comonomers selected from vinyl aromatic monomers and ethylenically unsaturated nitrile monomers, such as, for example, styrene-butadiene copolymers, acrylonitrile-butadiene copolymers and styrene-butadiene-acrylonitrile copolymers. In a third preferred embodiment, the substrate comprises repeating units derived from one or more ($C_1$–$C_{12}$)alkyl acrylate monomers, more preferably from one or more monomers selected from butyl acrylate and n-hexyl acrylate including mixtures of one or both of the foregoing with other acrylates such as, for example, ethyl acrylate. In a fourth preferred embodiment, the substrate comprises units derived from one or more olefin monomers and includes, for example, ethylene/propylene copolymers, ethylene/propylene/non-conjugated diene monomer terpolymers.

Suitable rubbery polymeric substrates are made by known processes, for example, emulsion polymerization and mass polymerization. Generally, the rubbery polymeric substrate is made by aqueous emulsion polymerization in the presence of a free radical initiator, for example, an organic peroxide or persulfate initiator or a redox initiator system, and, optionally, in the presence of a chain transfer agent, for example, an alkyl mercaptan. The rubbery polymeric substrate may exhibit a unimodal particle size distribution or a multimodal distribution, such as a bimodal distribution.

The graft copolymer resin, in addition to comprising a rubbery polymeric substrate, also contains a rigid polymeric superstrate. The rigid polymeric superstrate includes repeating units derived monomers selected from the group consisting of ($C_1$–$C_{12}$)alkyl acrylate monomers, vinyl aromatic monomers and ethylenically unsaturated nitrile monomers. One skilled in the art can select an appropriate monomer or combination of monomers to afford a suitable rigid polymeric substrate. Suitable vinyl aromatic monomers and ethylenically unsaturated nitrile monomers are set forth above. As used herein the terminology alkyl acrylate monomers refers collectively to acrylate monomers and methacrylate monomers. Suitable alkyl acrylate monomers include the acrylate monomers disclosed above and their methacrylate analogs such as, for example, methyl methacrylate, ethyl methacrylate, propyl methacrylate, isopropyl methacrylate, butyl methacrylate, hexyl methacrylate, decyl methacrylate, and the like.

In a preferred embodiment, the rigid polymeric superstrate comprises repeating units derived from one or more monomers selected from styrene, α-methyl styrene, and acrylonitrile. In a more preferred embodiment, the superstrate comprises from about 60% to about 90% by weight repeating units derived from styrene and from about 10% to about 40% by weight repeating units derived from acrylonitrile.

In an alternative preferred embodiment, the rigid polymeric superstrate comprises repeating units derived from one or more ($C_1$–$C_{12}$)alkyl acrylate monomers, and may, optionally, further comprise repeating units derived from one or more monomers selected from vinyl aromatic monomers and ethylenically unsaturated nitrile monomers. In another preferred embodiment, the rigid polymeric superstrate comprises greater than or equal to 50% by weight repeating units derived from one or more ($C_1$–$C_{12}$)alkyl acrylate monomers, more preferably from one or more monomers selected from methyl methacrylate, ethyl methacrylate, propyl methacrylate, isopropyl methacrylate and butyl methacrylate.

The rubbery substrate and the rigid superstrate may each independently optionally include minor amounts, for example, up to about 15% by weight of the total weight of the respective substrate or superstrate, of repeating units derived from one or more other copolymerizable ethylenically unsaturated monomers. Illustrative examples of suitable copolymerizable unsaturated monomers include ethylenically unsaturated carboxylic acids such as, for example, acrylic acid, methacrylic acid, itaconic acid; hydroxy ($C_1$–$C_{12}$)alkyl acrylate monomers such as, for example, hydroxyethyl methacrylate; ($C_4$–$C_{12}$)cycloalkyl acrylate monomers such as for example, cyclohexyl methacrylate; (meth)acrylamide monomers such as, for example, acrylamide and methacrylamide; vinyl esters such as, for example, vinyl acetate and vinyl propionate. The ($C_4$–$C_{12}$)cycloalkyl moiety above includes cyclic alkyl substituent groups having from about 4 to about 12 carbon atoms per group and the term (meth)acrylamide refers collectively to acrylamides and methacrylamides. Those skilled in the art can readily select other suitable copolymerizable ethylenically unsaturated monomers based, in part, on specific requirements for a particular composition.

The rigid polymeric superstrate may, optionally, include a minor amount, for example, up to about 3% by weight, more preferably up to about 1.5% by weight, of repeating units derived from one or more polyethylenically crosslinking monomers. Suitable crosslinking monomers are disclosed above.

The graft copolymer is made according to known processes by polymerizing one or more monomers selected to provide a rigid polymeric superstrate in the presence of particles of the rubbery polymeric substrate under conditions such that at least a portion of the rigid polymeric superstrate is chemically grafted to the rubbery polymeric substrate by covalent bonds. In a preferred embodiment, the superstrate monomers are polymerized by an aqueous emulsion or aqueous suspension polymerization reaction in the presence of substrate particles and a polymerization initiator system, for example, a thermal or redox initiator system wherein a portion of the polymerizing chains of the superstrate monomers are chemically bonded or grafted to the substrate via reaction with unsaturated sites in the substrate. The unsaturated sites in the substrate are provided, for example, by residual unsaturated sites in repeating units derived from a conjugated diene or by residual unsaturated sites in repeating units derived from a graft linking monomer. In a preferred embodiment, the graft copolymer resin is a high rubber graft copolymer resin. By the term high rubber graft is meant that greater than about 30% by weight, preferably greater than about 45% by weight of the rigid polymeric superstrate is chemically grafted to the rubbery polymeric substrate.

In a first preferred embodiment, the substrate comprises repeating units derived from one or more conjugated diene monomers, and may, optionally, further comprise repeating units derived from one or more monomers selected from vinyl aromatic monomers and ethylenically unsaturated nitrile monomers, and the superstrate comprises repeating units derived from one or more monomers selected from butadiene, vinyl aromatic monomers and ethylenically unsaturated nitrile monomers. The preferred graft copolymer resins include, for example, acrylonitrile-butadiene-styrene resins commonly referred to as "ABS" resins.

Especially preferred are acrylonitrile-butadiene-styrene copolymers having greater than 30% by weight rubbery polymeric substrate, preferably greater than about 45% by weight rubbery polymeric substrate. The most preferred rubbery substrates comprise polybutadiene or styrene-butadiene copolymer. Also preferred are high rubber graft acrylonitrile-butadiene-styrene copolymers. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, GE Specialty Chemicals, Inc. under the trademark BLENDEX and include grades 131, 336, 338, 360, and 415.

In another preferred embodiment, the rubbery polymeric substrate comprises repeating units derived from one or more ($C_1$–$C_{12}$)alkyl acrylates and the superstrate comprises repeating units derived from one or more monomers selected from vinyl aromatic monomers and ethylenically unsaturated nitrile monomers, and include, for example, styrene-acrylate ("SA") high rubber graft copolymers and acrylonitrile-styrene-acrylate ("ASA") high rubber graft copolymers. Suitable ASA-type graft copolymers are commercially available from, for example, GE Specialty Chemicals, Inc. under the trademark BLENDEX and include grade 975, 977, and 980.

In a third preferred embodiment, the substrate comprises repeating units derived from one or more conjugated diene monomers and may, optionally, further comprise repeating units derived from one or more monomers selected from ($C_1$–$C_{12}$)alkyl acrylate monomers, vinyl aromatic monomers and ethylenically unsaturated nitrile monomers, and the superstrate comprises repeating units derived from one or more ($C_1$–$C_{12}$)alkyl acrylate monomers and may, optionally, further comprise repeating units derived from one or more monomers selected from vinyl aromatic monomers and ethylenically unsaturated nitrile monomers, such as, for example, methyl methacrylate-acrylonitrile-butadiene-styrene ("MABS") high rubber graft copolymers, methacrylate-butadiene-styrene ("MBS") high rubber graft copolymers. Suitable MBS-type graft copolymers are commercially available from Rohm and Haas Company under the trademark PARALOID and include grades BTA-733 and BTA-753 and from Kaneka Texas under the trademark KANE ACE and include grade B-56.

In another preferred embodiment, the superstrate comprises repeating units derived from one or more olefin monomers and may, optionally, further comprise repeating units derived from one or more non-conjugated diene monomers, and the superstrate comprises repeating units derived from one or more monomer selected from vinyl aromatic monomers and ethylenically unsaturated nitrile monomers, and include, for example, acrylonitrile-ethylene-propylene-styrene ("AES") high rubber graft copolymers.

In another preferred embodiment, the substrate comprises repeating units derived from one or more ($C_1$–$C_{12}$)alkyl acrylate monomer and the superstrate comprises repeating units derived from one or more ($C_1$–$C_{12}$)alkyl (meth) acrylate monomer, and include, for example, acrylic core-shell graft copolymers. Also included with the acrylic core-shell graft copolymers are butadiene modified acrylic copolymers. Suitable acrylic-type graft copolymers are commercially available from Rohm and Haas Company under the trademark PARALOID and include grades KM 334 and KM 355 and from Elf Atochem as grade Dura-strength 200.

The amount of graft copolymer resin in the present invention can vary widely depending on, for example, the ultimate ductility desired, the chemical make-up of the graft copolymer, as well as any additives contained in the final PVC composition. One of ordinary skill in the art can readily adjust the amounts of the ingredients without undue experimentation. Generally, the amount of graft copolymer to PVC is in the range of about 1% by weight to about 30% by weight, preferably between about 2% by weight to about 15% by weight, based on the weight of the PVC.

The amount of polybutene polymer which is used is any amount sufficient to improve the impact resistance of the PVC containing at least one impact modifier. Amounts of at least about 0.10 part polybutene polymer per hundred parts PVC are necessary to significantly improve the impact resistance values, and amounts as much as 5 parts are operable. Preferably, about 0.25 to about 1.5 parts by weight are typically used.

As another advantage of this invention, it was unexpectedly found that the thermal stability properties were improved by this invention, making the impact modified PVC more suitable for applications such as rigid siding, bottles and automotive applications. Thus, it should be clear that the present invention affords PVC compositions have improved thermal stability of as measured by Brabender rheology testing of at least about 7%, preferably of at least about 15%, and most preferably of at least about 23%, wherein the percent improvement is determined by comparing the times to achieve a 200 meter/gram rise or fall from equilibrium torque. Generally, the impact modified PVC polymers have outstanding utility in a wide variety of applications where a rigid, impact resistant PVC is needed.

The PVC compositions of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be premixed or precompounded with each other or with one of the components. It appears that certain properties, such as impact strength and elongation, are sometimes enhanced by initially premixing the polybutene with the impact modifier prior to blending with the PVC and remaining components. It is also sometimes advantageous to employ at least one vent port in each section between the feed ports to allow venting (either atmospheric or vacuum) of the melt Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention. These articles can be made by methods known in the art including, for example, injection molding, extrusion, blow molding, foam molding, compression molding, stamping and the like.

All patents cited by reference are incorporated herein by reference.

In order that those skilled in the art will be better able to practice the invention, the following examples are given by way of illustration and not by way of limitation. All percentages are by weight based on the total weight of the entire composition, unless otherwise indicated.

EXAMPLES

The following illustrative examples were prepared by allowing the polybutene polymer to absorb into the impact modifier prior to addition to the PVC and additive components. All ingredients were dry blended with a high speed mixer followed by extrusion compounding using a Werner-Pfliederer 30 mm twin screw extruder into 0.030 to 0.040 inch thick sheets for testing.

Thermal testing was done using a C. W. Brabender #6 head mixer using about 65 grams of material at about 60 rpm at about 187° C. Gardner drop dart testing was done according to ASTM D-4226 method A.

Materials used are as follows:

PVC is a commercially available polyvinyl chloride polymer.

L-65 is a polybutene resin obtained from Amoco Chemical Co.

H-100 is a polybutene resin obtained from Amoco Chemical Co.

S-236 is a severely solvent refined heavy paraffinic petroleum oil obtained from Sun Company, Inc. as grade Sunthene 236.

IM-1 is a commercially available acrylonitrile-butadiene-styrene copolymer resin comprising about 70% by weight of a polybutadiene rubbery polymeric substrate and about 30% by weight of a styrene-acrylonitrile copolymer rigid polymeric superstrate having a styrene to acrylonitrile weight ratio of about 3:1 and having less than about 10% of the styrene-acrylonitrile copolymer free (i.e., non-grafted). The rubbery polymeric substrate had a number average molecular weight, relative to polystyrene standards, of between about 16,000 and about 22,000 and the rigid polymeric superstrate had a number average molecular weight, relative to polystyrene standards, of between about 12,000 and about 33,000.

IM-2 is a commercially available methyl methacrylate-butadiene-styrene copolymer resin comprising about 70% by weight of a polybutadiene rubbery polymeric substrate and about 30% by weight of a styrene-methyl methacrylate copolymer rigid polymeric superstrate having a styrene to methyl methacrylate weight ratio of about 1:1 and having less than about 10% of the styrene-methyl methacrylate copolymer free (i.e., non-grafted).

IM-3 is a commercially available acrylate core-shell copolymer resin comprising a shell of about 80% by weight of a poly(butyl acrylate) rubbery polymeric substrate and about 20% by weight of a methyl methacrylate copolymer rigid polymeric superstrate. The acrylate core-shell copolymer resin is commercially available from Rohm and Haas under the tradename Paraloid and is sold as grade KM-334.

Adds is an additive package added to each composition. The package contained the following ingredients added as part by weight based on 100 parts PVC.

0.8 a methyl tin stabilizer
0.5 high molecular weight processing aid of methyl methacrylate-styrene-acrylonitrile copolymer
1 Calcium stearate
1.3 paraffin wax having a melting point of about 165° F.
0.35 oxidized polyethylene wax
10 calcium carbonate
1 titanium dioxide

TABLE 1

| Sample: | 1 | 2 | 3 | 4 | 5 | 6 | 7 | 8 | 9 | 10 | 11 |
|---|---|---|---|---|---|---|---|---|---|---|---|
| PVC | 100 | 100 | 100 | 100 | 100 | 100 | 100 | 100 | 100 | 100 | 100 |
| IM-1 | 4 | 3.75 | 3.50 | 3.25 | 3.75 | 3.50 | 3.25 | 0 | 0 | 0 | 0 |
| IM-2 | 0 | 0 | 0 | 0 | 0 | 0 | 0 | 4 | 3.75 | 3.50 | 3.25 |
| L-65 | 0 | 0.25 | 0.50 | 0.75 | 0 | 0 | 0 | 0 | 0.25 | 0.50 | 0.75 |
| H-100 | 0 | 0 | 0 | 0 | 0.25 | 0.50 | 0.75 | 0 | 0 | 0 | 0 |
| Properties: | | | | | | | | | | | |
| Dart impact (in-lbs/mil) | 3.2 | 3.3 | 3.5 | 3.2 | 3.4 | 3.7 | ** | 3.5 | 3.5 | 3.3 | 3.5 |
| DTS (min:sec) | 33:42 | 42:46 | 43:46 | 42:58 | 41:44 | >55:00 | NA | 26:16 | 30:50 | 30:22 | >50 |

The illustrative examples in Table 1 demonstrate the unexpected result that a reduced impact modifier level may be utilized without significant loss in impact properties with the addition of the polybutene polymer to the impact-resistant blend of PVC. The illustrative example further demonstrate the improved thermal performance obtained with the addition of the polybutene polymer. These results were unexpected in view of the prior art.

TABLE 2

| | Sample: | | | |
|---|---|---|---|---|
| | 12 | 13 | 14 | 15 |
| PVC | 100 | 100 | 100 | 100 |
| IM-3 | 4 | 3.75 | 3.5 | 3.25 |
| L-65 | 0 | 0.25 | 0.50 | 0.75 |
| Properties: | | | | |
| Dart impact (in-lb/mil) | 3.5 | 3.7 | 3.6 | 3.3 |
| DTS (min:sec) | 21:20 | 22:50 | 22:58 | 26:48 |

The results obtained for the illustrative compositions found in Table 2 further demonstrate the unexpected wide utility of the polybutene polymer in impact-resistant blends of PVC.

TABLE 3

| | Sample: | | |
|---|---|---|---|
| | 16 | 17 | 18 |
| PVC | 100 | 100 | 100 |
| IM-1 | 4 | 3.5 | 3.5 |
| L65 | 0 | 0.5 | 0 |
| S-236 | 0 | 0 | 0.5 |
| Properties: | | | |
| Dart impact (in-lb/mil) | 1.7 | 2.1 | 1.8** |
| DTS (min:sec) | 17:38 | 21:50 | 22:50 |

**poor surface appearance

The results in Table 3 demonstrate compare polybutene polymer to a common paraffinic oil used to modify elastomeric block copolymers. As seen by these data, the paraffinic oil resulted in an unacceptable surface appearance. These data further illustrate the unexpected results for obtaining an improved surface appearance for impact-resistant blends of PVC with the use of a polybutene polymer. The samples in Table 3 were prepared on a two-roll mill as opposed to an extruder as used to prepare the samples in the other tables.

What is claimed:

1. A composition comprising a poly(vinyl chloride), a polybutene polymer and a graft copolymer resin comprising a rubbery polymeric substrate and a rigid polymeric superstrate, wherein said graft copolymer resin is at least one resin selected from the group consisting of acrylonitrile-butadiene-styrene resins, acrylonitrile-ethylene-propylene-styrene copolymers, acrylic graft copolymers, methyl methacrylate-acrylonitrile-butadiene-styrene copolymers, methacrylate-butadiene-styrene copolymers, styrene-acrylate copolymers, and acrylonitrile-styrene-acrylate copolymers.

2. The composition of claim 1, wherein said polybutene polymer has a number average molecular weight range of from about 100 to about 5,000 g/mol as determined by gel permeation chromatography.

3. The composition of claim 1, wherein said graft copolymer resin comprises an acrylonitrile-butadiene-styrene resin.

4. The composition of claim 1, wherein said graft copolymer resin comprises an acrylonitrile-ethylene-propylene-styrene copolymer.

5. The composition of claim 1, wherein said graft copolymer resin comprises an acrylic graft copolymer.

6. The composition of claim 1, wherein said graft copolymer resin comprises a methyl methacrylate-acrylonitrile-butadiene-styrene copolymer.

7. The composition of claim 1, wherein said graft copolymer resin comprises a methacrylate-butadiene-styrene copolymer.

8. The composition of claim 1, wherein said graft copolymer resin comprises an acrylonitrile-styrene-acrylate copolymer.

9. The composition of claim 1, wherein said graft copolymer resin comprises a styrene-acrylate copolymer.

10. The composition of claim 1, wherein said graft copolymer resin comprises at least about 30% by weight of a rigid polymeric phase chemically bound or grafted to a rubbery polymeric phase.

11. The composition of claim 10, wherein said graft copolymer resin is an acrylonitrile-butadiene-styrene resin containing at least about 45% by weight of a rigid polymeric phase chemically bound or grafted to a rubbery polymeric phase.

12. The composition of claim 1, further comprising at least one additional component selected from the group consisting of fillers, stabilizers, modifiers, colorants, lubricants, and other additives.

13. A composition consisting essentially of a poly(vinyl chloride), a polybutene polymer and a graft copolymer resin comprising a rubbery polymeric substrate and a rigid polymeric superstrate, wherein said graft copolymer resin is at least one resin selected from the group consisting of acrylonitrile-butadiene-styrene resins, acrylonitrile-ethylene-propylene-styrene copolymers, acrylic graft copolymers, methyl methacrylate-acrylonitrile-butadiene-styrene copolymers, methacrylate-butadiene-styrene copolymers, styrene-acrylate copolymers, and acrylonitrile-styrene-acrylate copolymers.

14. The composition of claim 13, further consisting essentially of at least one additional component selected from the group consisting of fillers, stabilizers, modifiers, colorants, lubricants, and other additives.

15. A process for modifying the impact and thermal stability properties of poly(vinyl chloride) comprising adding thereto about 0.10 to about 5 parts by weight of a polybutene polymer based on 100 parts of poly(vinyl chloride) and a graft copolymer resin comprising a rubbery polymeric substrate and a rigid polymeric superstrate, wherein said graft copolymer resin is at least one resin selected from the group consisting of acrylonitrile-butadiene-styrene resins, acrylonitrile-ethylene-propylene-styrene copolymers, acrylic graft copolymers, methyl methacrylate-acrylonitrile-butadiene-styrene copolymers, methacrylate-butadiene-styrene copolymers, styrene-acrylate copolymers, and acrylonitrile-styrene-acrylate copolymers.

16. The process of claim 15, comprising adding at least one additional component selected from the group consisting of fillers, stabilizers, modifiers, colorants, lubricants, or other additives.

17. A composition made by the process of claim 15.

* * * * *